(12) United States Patent  
Henson et al.

(10) Patent No.: US 6,193,054 B1  
(45) Date of Patent: Feb. 27, 2001

(54) MODULAR ACCUMULATOR CONVEYOR SYSTEM

(75) Inventors: Mark W. Henson; Floyd Robertson, Jr., both of Danville, KY (US)

(73) Assignee: FKI Industries, Inc., Mathews Conveyor Division

( * ) Notice: Subject to any disclaimer, the term of this patent is extended or adjusted under 35 U.S.C. 154(b) by 0 days.

(21) Appl. No.: 09/127,245

(22) Filed: Jul. 31, 1998

(51) Int. Cl.[7] ............................................. B65G 13/00
(52) U.S. Cl. .................. 198/783; 198/781.09; 198/833; 198/840
(58) Field of Search ............................ 198/783, 781.06, 198/781.09, 957, 833, 790, 840

(56) References Cited

U.S. PATENT DOCUMENTS

| | | | |
|---|---|---|---|
| 722,252 | * 3/1903 | Richards | 198/840 |
| 3,247,950 | * 4/1966 | Roth | 198/790 |
| 3,730,330 | * 5/1973 | DeGood | 198/781.09 |
| 3,869,574 | * 3/1975 | Kume | 198/833 |
| 3,994,390 | * 11/1976 | Peterson, Jr. et al. | 198/833 |
| 4,227,607 | 10/1980 | Malavenda . | |
| 4,234,078 | * 11/1980 | Nott | 198/833 |
| 4,264,004 | 4/1981 | Harwick . | |
| 4,353,458 | * 10/1982 | Saur | 198/781.09 |
| 4,361,225 | 11/1982 | Saur . | |
| 4,363,399 | * 12/1982 | Ludwig et al. | 198/830 |
| 4,511,030 | 4/1985 | Lem . | |
| 4,574,943 | * 3/1986 | Green | 198/833 |
| 4,819,788 | 4/1989 | Van Der Schie . | |
| 4,919,255 | 4/1990 | Morgan et al. . | |
| 4,942,957 | * 7/1990 | Bonifer et al. | 198/781.09 |
| 5,016,748 | 5/1991 | Garzelloni . | |
| 5,060,785 | 10/1991 | Garrity . | |
| 5,083,655 | 1/1992 | Becker . | |
| 5,086,910 | 2/1992 | Terpstra . | |
| 5,211,281 | 5/1993 | Almes . | |
| 5,285,887 | 2/1994 | Hall . | |
| 5,348,139 | * 9/1994 | Szarkowski et al. | 198/790 |
| 5,375,689 | 12/1994 | Sapp et al. . | |
| 5,415,274 | * 5/1995 | Krismanth et al. | 198/833 |
| 5,456,347 | 10/1995 | Best et al. . | |
| 5,540,323 | 7/1996 | Schiesser et al. . | |
| 5,582,286 | 12/1996 | Kalm et al. . | |
| 6,065,588 | * 5/2000 | Cotter et al. | 198/781.09 |

FOREIGN PATENT DOCUMENTS

| | | | |
|---|---|---|---|
| 2241193 | * 3/1974 | (DE) | 198/781.09 |
| 1352370 | * 5/1974 | (GB) | 198/781.09 |

* cited by examiner

*Primary Examiner*—Douglas Hess  
(74) *Attorney, Agent, or Firm*—King and Schickli PLLC

(57) ABSTRACT

A conveyor system especially suitable for transfer and spacing of articles in a smooth distortion-free manner and controlled acceleration/deceleration is provided. An endless transfer belt is driven by an endless drive belt selectively engaging the lower return run thereof. An actuator assembly including a pneumatic motor lifts a pressure roller mounted in a cradle to provide the driving function in response to one or more controllers. A plurality of transfer belt modules, all driven by the single drive belt, are aligned to form an accumulation conveyor system for establishing zero pressure between the articles. Each transfer run is supported and guided along a flat plate to provide the smooth conveying surface and to steady the articles. In the related method, the drive belt selectively drives the transfer belt or belts of the single or modular conveyors by lifting the driving run into engagement with the return run. The spacing of the articles is controlled by the one or more controllers.

18 Claims, 5 Drawing Sheets

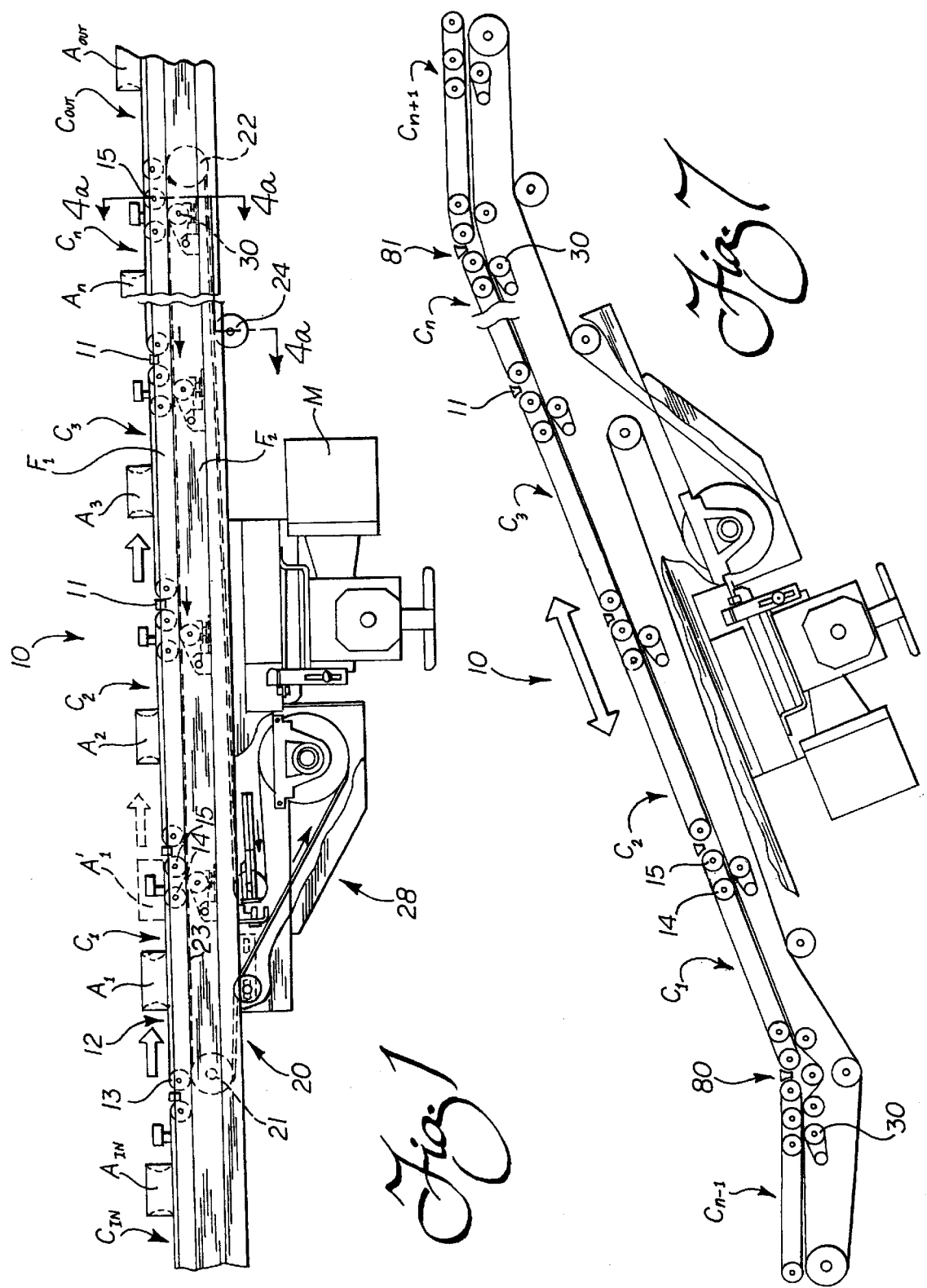

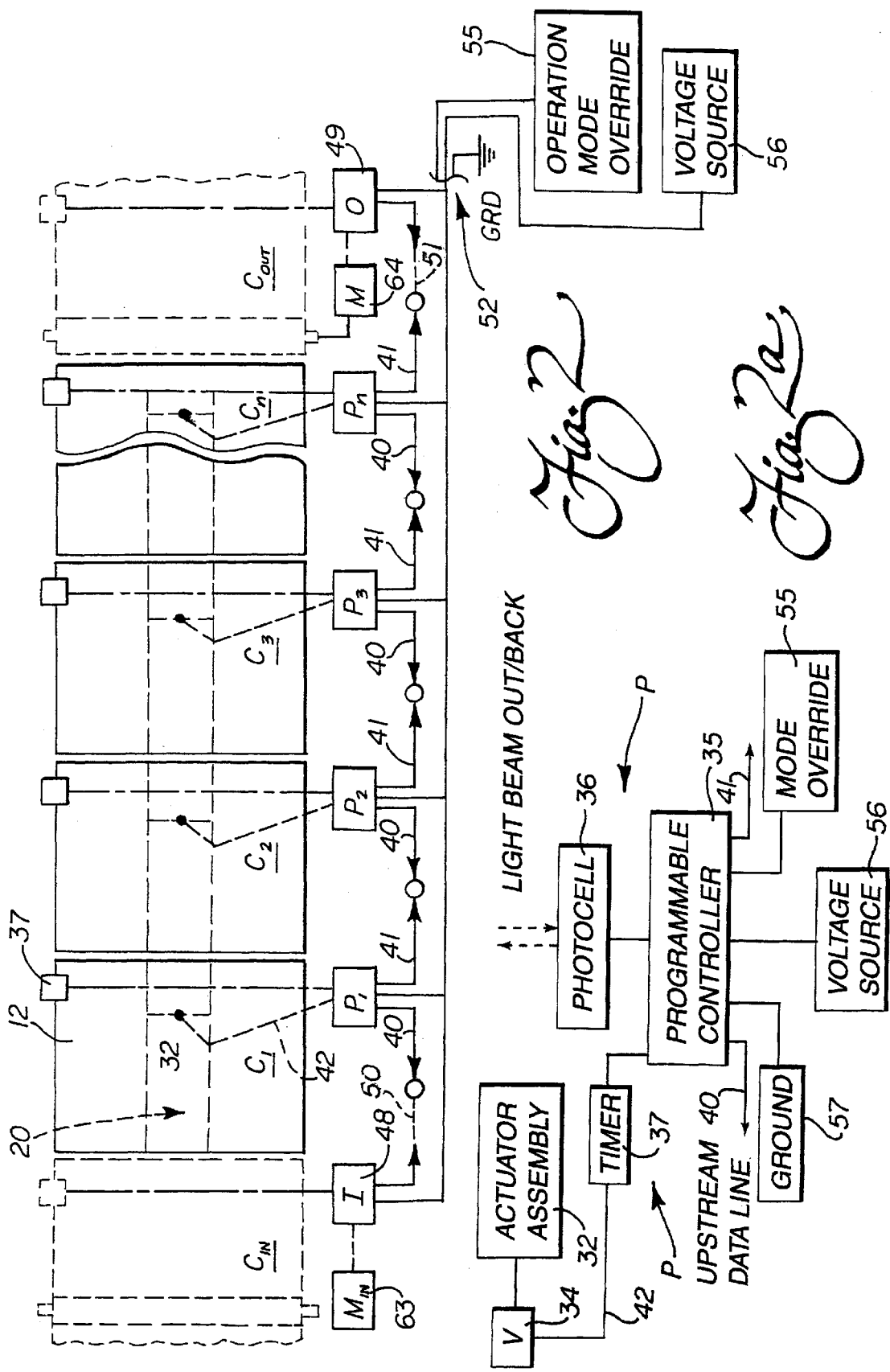

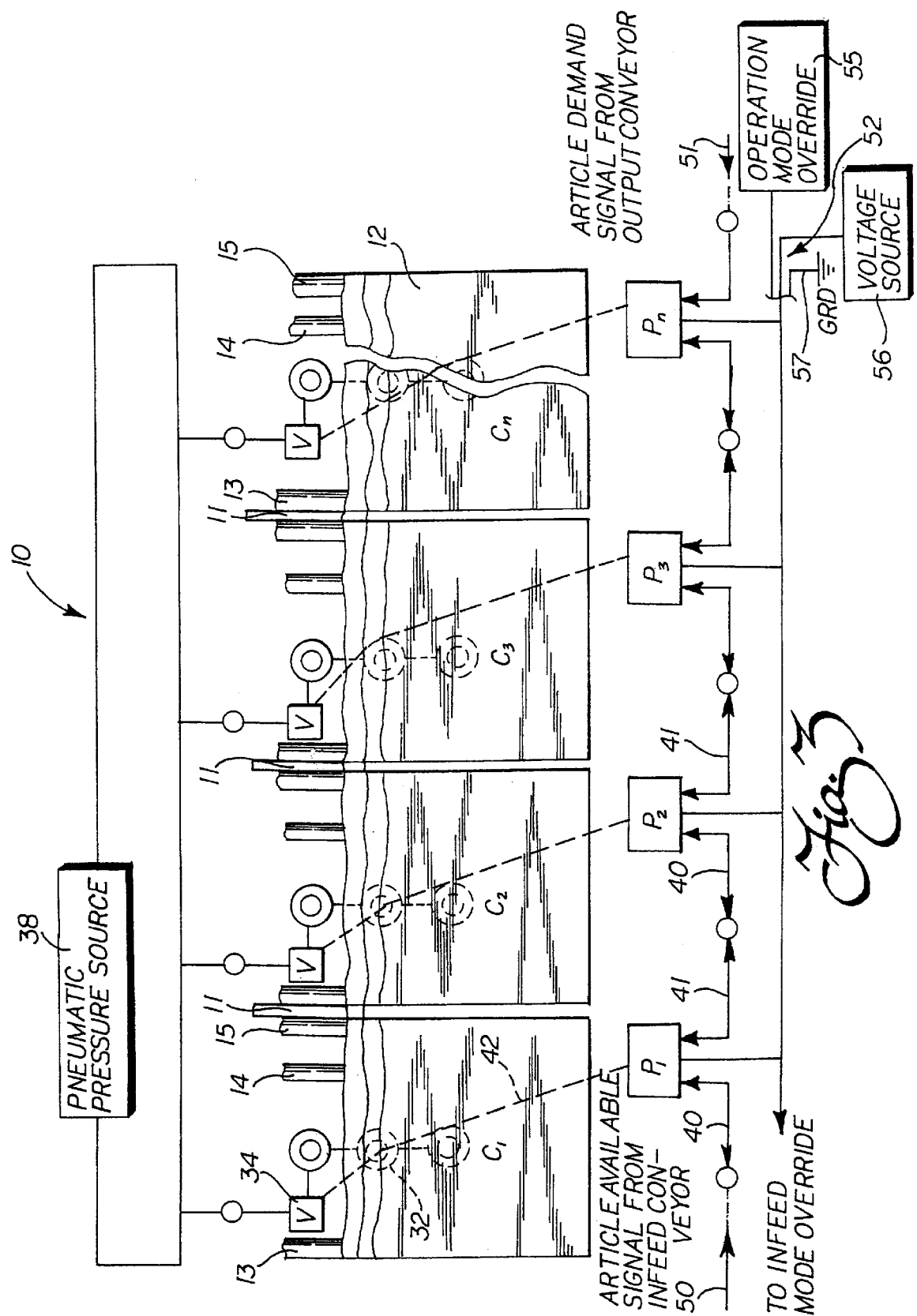

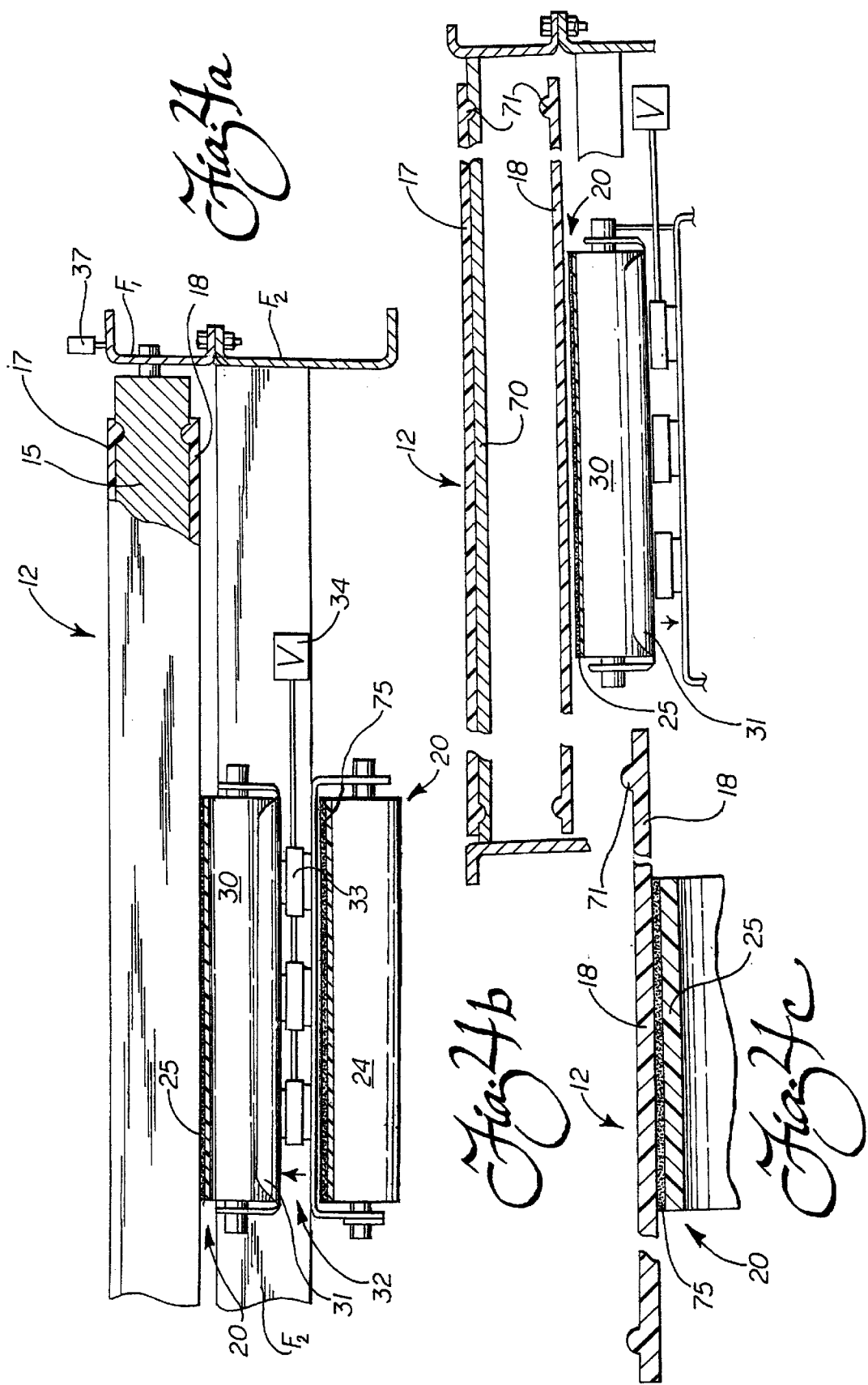

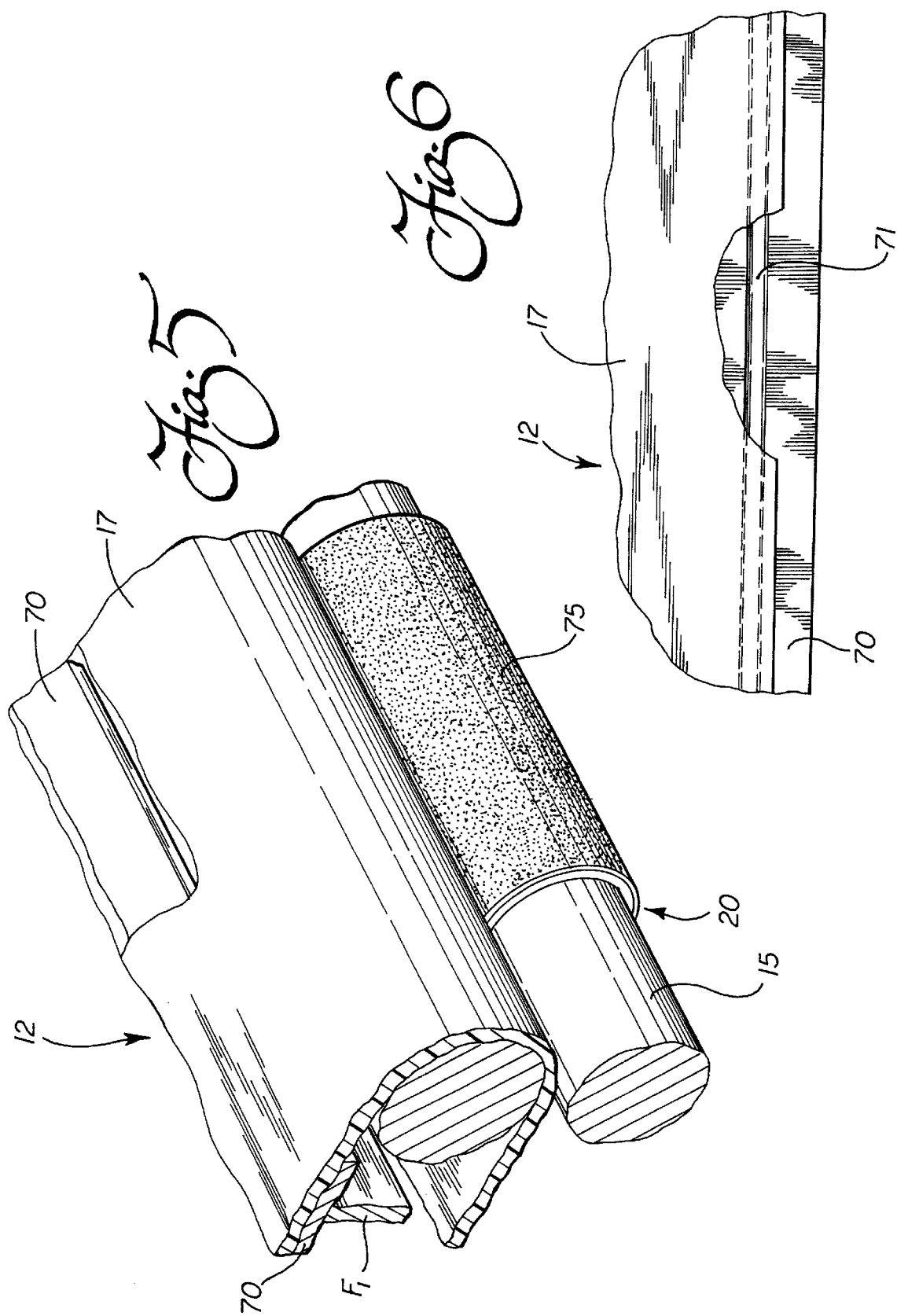

MODULAR ACCUMULATOR CONVEYOR SYSTEM

TECHNICAL FIELD

The present invention relates to endless conveyors for transfer of articles, such as in a manufacturing environment, and more particularly, to an endless conveyor system for spacing and accumulating articles, especially in the context of articles having contents, bottom or end faces subject to distortion or damage due to rough handling.

BACKGROUND OF THE INVENTION

It is well known to provide conveyors that space articles, or in addition provide accumulation of articles in a conveyor system where a plurality of individual zones for separating articles are provided. The standard in the industry for such conveyors utilizes powered rollers to provide the conveying surface for the articles. One known arrangement is for the rollers to be idlers, with each group of idlers being driven by individual drive belts that engage the underside of the rollers. One approach of this type of spacing/accumulating conveyor system is the Hardwick U.S. Pat. No. 4,264,004.

While this type of conveyor system has proven to be successful, one major shortcoming is that the movement of articles is subjected to considerable vibration due to the bottom of the article bumping across the individual rollers during the conveying movement. Especially where the rollers are relatively widely spaced in order to help control the costs of such conveyors, many articles are subjected to considerable distortion or damage. This is especially prevalent with respect to electronic products or other packages with delicate contents. Also, damage due to distortion of the underside of certain articles as each of the rollers is engaged and bumped during conveying, such as occurs with paperboard drink can carriers, is intolerable and a different approach is clearly needed. Another example of this type of prior art conveyor system is illustrated in the Garrity U.S. Pat. No. 5,060,785.

In some article conveyor systems, such as for transferring and storing of luggage and baggage in airline terminals and the like, there has been some useful development in the use of conveyor belts, rather than powered rollers, as set forth in the Malavenda U.S. Pat. No. 4,227,607. Since this type of article is understood by the public to include rough handling, these systems have not been refined with a view to handling articles that are subject to distortion or damage. Thus, for example, these conveyor systems in most instances do not depart from the usual approach of allowing the articles to bump and vibrate during the conveying operation. Furthermore, the cost of such systems is exaggerated due to the need to employ individual motors for each of the sections or zones in the conveyor system.

A more recent approach than is represented by the '607 patent is illustrated in the patent to Saar, U.S. Pat. No. 4,361,225. In this arrangement, a relatively narrow driven belt is powered by a circular 0-ring drive belt that must be shifted laterally so as to be fully tensioned around a drive roll for a narrow belt. In the neutral position, the 0-ring belt is laterally shifted and positioned so as not to be tensioned, and thus to eliminate the driving function. The nature of the 0-ring drive belt and the relative narrow width of the belt in the '225 patent seriously limits the use of a conveyor system constructed in accordance with this disclosure.

With the above analysis in mind, what is missing in the art is broadly defined as a spacing conveyor system, and more specifically in accordance with the preferred embodiment, a multiple zone accumulation conveyor system that overcomes these problems. The need that exists is for a conveyor system for spacing/accumulation especially adapted for articles that must be protected from jarring during handling and which makes use of a simplified drive mechanism. In the preferred embodiment, a particular advantage is sought for a conveyor system having a drive mechanism employing a single drive belt to power the plurality of belt conveyors making up a spacing and/or accumulation conveyor system. As an adjunct to this improved arrangement, the system is to be simplified and reduced in cost substantially over the prior art arrangements.

SUMMARY OF THE INVENTION

Keeping in mind the above needs for a new type of spacing/accumulation conveyor, it is a primary object of the present invention to provide a conveyor system that makes use of a driven belt or belts for conveying having contents, bottom or end faces subject to distortion or damage by rough handling, but not necessarily limited thereto.

It is another object of the invention to provide a simplified drive mechanism featuring a single drive belt, including for selectively driving multiple belts, when an accumulation conveyor system is provided.

It is another object of the present invention to provide a conveyor system utilized for spacing and/or accumulating articles along a flow path that is simple in mechanical, as well as electrical control design, and is low cost to produce and maintain.

It is still another object of the present invention to provide a conveyor system wherein an endless transfer belt, singularly or in combination with others, is driven by a drive belt by frictional driving engagement in such a manner as to provide smooth, distortion-free article transfer and controlled acceleration/deceleration of the articles.

It is still another object of the present invention to provide an accumulation conveyor system of the type described wherein there is a plurality of transfer belt modules that are positioned in alignment and are driven from a single, continuously driving drive belt.

Another related object is to provide a conveyor system with a single drive belt that engages and drives the transfer belt(s) so as to provide the most efficient component use for the least cost and at the same time substantially eliminates damage to the articles being conveyed.

Another object of the present invention is to provide an accumulation conveyor system utilizing one or more endless conveyor belts for support of the articles, and a drive belt that is cooperative with the return run of the driven belt in order to allow smooth transfer and controlled acceleration and deceleration with respect to the transfer speed.

It is still another object of the present invention to provide a conveyor system that best utilizes individual accumulation zones to provide zero pressure conditions for the articles, and a related object to utilize the system to provide incline/decline zones implementing a change in elevation along the conveyor line.

It is still another object of the present invention to provide such a conveying system having a drive belt/transfer belt driving interface that is particularly adapted for use in either the simple, article spacing environment, or in the preferred and related field of an accumulation conveyor system.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a conveyor system is provided with an endless transfer belt for conveying articles and an endless drive belt extending substantially parallel in the longitudinal direction, and wherein the transfer belt is driven by the engagement of the drive belt along the lower return run thereof. As a result of this arrangement, the articles are efficiently transferred, and are protected from distortion or damage, especially those articles that have contents, bottom or end faces subject to distortion or damage from jarring or rough handling. The arrangement provides for rapid, spaced transfer of the articles and in a preferred embodiment allows accumulation of the articles in a unique and highly efficient manner. While the conveyor system is especially adapted for articles that require gentle handling, as indicated above, it is to be understood that the conveyor system can of course be utilized for other articles over a wide range of sizes and weights and regardless of the physical restrictions on handling of the articles.

Regardless of the number of transfer belts that are positioned in line for handling of the articles, such as in an accumulation conveyor environment, a drive mechanism features a drive belt having a single drive motor, which is of particular advantage in terms of low cost, minimum wiring of the system and maintenance. In the neutral position, the upper driving run of the drive belt is aligned in proximity too, but spaced from the lower return run of the transfer belt and an actuator assembly is utilized for selectively lifting it into frictional driving engagement with the lower return run. A controller, either individually for each of the accumulation zones, or a single controller, is effective to provide the desired spacing between the articles and the starting/stopping of the articles. As a result, smooth, distortion-free article transfer and controlled acceleration/deceleration with respect to the transfer speed for spacing and accumulation of articles is provided.

The control arrangement in the preferred embodiment utilizes an article sensor and individual solid state controller associated with each accumulation zone. This arrangement operates to insure that only one article is positioned in a zone at the time and the article transfer is carried out with the advantages desired, including assuring zero pressure between the articles. The low cost, minimum wiring and reduced maintenance are key improvement features here. These features are further enhanced by making each accumulation zone modular in nature. In the unlikely event that a problem develops, a new controller and/or module can be quickly substituted preventing any significant downtime.

In accordance with another feature of the preferred embodiment, the special drive belt needs to be one of a width of only between ¼ and ⅓ the width of the transfer belt. At least one pressure roller lifts that section of the inside of the drive belt into engagement with the transfer belt module. The pressure roller is carried on a cradle and a pneumatic motor, preferably in the form a diaphragm, is used to lift the cradle so as to engage the driving relationship of the belts.

To assist in the smooth distortion-free transfer and to steady the articles as they are being conveyed, the upper run of the transfer belt is preferably supported on a flat plate or surface having a relatively low friction surface. This is a substantial advantage for the spacing/accumulation conveyor system of the present invention over the prior art powered roller systems with respect to protecting the articles being conveyed. Lateral guide channels along the edges of the plate or surface engage corresponding beads on the underside of the transfer belt to provide efficient tracking during operation. An annular channel at each end of the guide rolls for the transfer belt of each module provides for additional guiding.

To provide for controlled acceleration/deceleration of the upper run of the transfer belt, an outer layer formed of a compressible mat is provided. As the drive belt engages the transfer belt, the mat is compressed so as to provide a gradually increasing coefficient of friction and prevent any potential for grabbing of the transfer belt and thus jarring of the article. Upon deceleration the same gradual disengagement provides for a smooth transition to a full stop.

In the related method of operation of the conveyor system as described above, the endless drive belt is positioned so as to be aligned with the transfer belt, but spaced from it in the neutral position; driving the drive belt; lifting the driving run of the drive belt into engagement with the transfer belt; and controlling the spacing of the articles. The driving arrangement between the belts provides for a smooth, distortion-free article transfer and controlled acceleration/deceleration with respect to transfer speed. When a plurality of transfer belt modules are provided, thus forming an accumulation conveyor system, the drive belt is operative to selectively drive each individual transfer belt as required.

As an additional step in the method, each article being transferred in series is sensed and its position relative to the other articles compared by individual sensor/controller units, thus assisting in the step of controlling the spacing in an efficient manner. In this arrangement, it is assured that the desired result of having only one article present at any one time for each module is faithfully implemented, and as a result each article transfer is controlled in such a manner as to assure zero pressure between the articles, thus eliminating a major concern for distortion or damage of the articles. Preferably, the drive belt and any upstream transfer belts of empty modules are continuously driven until such time as the controller(s) time out when there are no articles on the input conveyor ready to be processed, or the output conveyor makes no call for more articles.

Still other objects of the present invention will become readily apparent to those skilled in this art from the following description wherein there is shown and described in more detail a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a side view illustrating the manner in which articles are conveyed along the conveyor system with individual conveyor modules for spacing and/or accumulation of the articles;

FIG. 2 is a top view in schematic form illustrating the plurality of individual conveyor modules, along with an input conveyor, as well as an output conveyor at the opposite end;

FIG. 2a is a schematic diagram of the individual, integrated photocell/controller and the related circuitry that is preferably dedicated to each individual accumulation module;

FIG. 3 is a top view illustrating the accumulation modules and providing additional details in schematic form with some components removed for clarity; the details including the pneumatic control circuit for the cradle and pressure roller providing the driving interface between the drive belt and the transfer belt; and also including additional details of the electrical control system;

FIG. 4a is a partial cross sectional view taken through the section of the conveyor system as represented by the line 4a—4a in FIG. 1 and illustrating the driving interface of the drive belt and the return run of the transfer belt;

FIG. 4b is a similar view to FIG. 4a, but broken away in a different manner, to illustrate the neutral position of the drive belt and the relationship of the transfer belt on the plate;

FIG. 4c is an enlarged, partial cross sectional view of the transfer belt (broken away for clarity) and with the mat layer of the drive belt in engagement with the underside of the return run of said transfer belt;

FIG. 5 is an end, cut away view in perspective of the transfer belt and the drive belt illustrating in more detail the relationship between the belts;

FIG. 6 is a cut away top view of the guide plate for the transfer run of the transfer belt illustrating the guide bead in position in the groove that permits accurate tracking of the transfer belt; and FIG. 7 is a schematic illustration of the conveyor system with an extended number of modules functioning to also perform an incline/decline in elevation along a conveyor line.

Reference will now be made in detail to the present preferred embodiment of the invention, an example of which is illustrated in the accompanying drawings.

DETAILED DESCRIPTION OF THE PREFERRED EMBODIMENT

Reference is now made to FIG. 1 of the drawings wherein is illustrated an overall view of a conveyor system, generally designated by the reference numeral 10, that embodies the features of the present invention. The particular conveyor system 10 shown to describe this preferred embodiment includes a series of belt conveyors positioned in line in a longitudinal direction and including an input conveyor $C_{in}$, a series of transfer belt modules $C_1$, $C_2$, $C_3$, $C_n$ and an output belt conveyor $C_{out}$. Positioned for illustrative purposes along the flow path established by this series of conveyors is an input or incoming article $A_{in}$, articles $A_1$, $A_2$, $A_3$, $A_n$ corresponding to the transfer belt modules $C_1$–$C_n$ and article $A_{out}$ corresponding to the output conveyor $C_{out}$. As illustrated, a bridge bar 11 is positioned in the gap between each of the belt modules to provide a smooth transition for the articles as they move along the flow path.

In the preferred embodiment shown, the conveyor system 10 is being utilized to space the articles $A_1$–$A_n$ so as to provide accumulation at zero pressure, which in terms of this application means simply that the articles are maintained in a substantially equally spaced position along the flow path provided by the conveyor system. The system 10 operating in this manner prevents the articles $A_1$–$A_n$ from bumping into each other thus giving rise to the concept of zero pressure, and accordingly avoid distortion or damage to the end faces during transfer. In its most usual application, the conveyor system 10 provides for a series of either equally spaced or randomly spaced input articles, such as article $A_{in}$, space and accumulate the articles $A_1$–$A_n$ over the length of the flow path defined by the system 10, and then release output articles, such as article $A_{out}$ upon demand.

Referencing now FIG. 2, as well as the remaining figures of the drawings as necessary, a more detailed description of each of the transfer belt modules $C_1$–$C_n$ can be made. It is to be understood that each of the modules are the same and can be easily substituted for each other or by replacement modules, as needed. Thus, there is provided an endless transfer belt 12 for each module that is trained about support roll 13 at an entrance end, and dual support rolls 14, 15 at an exit end adjacent the bridge bar 11 (see also the schematic showing in FIG. 3, as well as the illustration in FIGS. 4a and 5). As will be apparent from viewing these figures, the articles $A_1$–$A_n$ are carried on an upper transfer run 17, and a lower return run 18 is provided to complete each of the endless belts 12 (see FIGS. 4a–4b). The guide rolls 13–15 are supported on suitable modular frames $F_1$, that are detachable, as schematically shown in FIG. 4a, from the main frame $F_2$ of the conveyor system 10. Suitable fasteners can be provided between the modular and main frames $F_1$, $F_2$, as illustrated in FIG. 4a.

In accordance with an important feature of the present invention, an endless drive belt, generally designed by the reference numeral 20 is mounted on the main frame $F_2$ between end guide rolls 21, 22 (see FIG. 1). As is apparent in FIG. 1, upper driving run 23 of the drive belt 20 extends the full length of all of the modules $C_1$–$C_n$, and as will be apparent below serves to drive all of these modules in a novel manner. Specifically, the drive belt 20 is aligned along the longitudinal axis of the conveyor system 10, as best shown by the dotted line outline in FIG. 2. In the vertical plane, it is positioned in proximity to the return run 18 of each of the endless transfer belts 12 when in the neutral position (non-driving position). This is best illustrated in FIG. 4b, wherein is shown upper driving run 25 positioned centered and just below the lower return run 18 of the transfer belt 12. Reference can be made to FIGS. 1 and 4a that shows the return run 18 engaged by the drive belt 20, and this belt 20 is supported by a return idler 24, and otherwise in a manner to be further described below.

A driving mechanism, generally designated by the reference numeral 28, comprises the usual guide rollers, snubbing roller, main drive roll, transmission (all unnumbered) and a suitable electric drive motor M. During operation of the spacing/accumulation conveyor system 10, the drive belt 20 is continuously driven in the direction indicated by the action arrows in FIG. 1. As a result, specifically due to the driving engagement between the upper driving run 25 and the lower return run 18 of the endless transfer belt 12, the articles $A_1$–$A_n$ are capable of being moved forward in the direction from left to right, as shown by the full action arrows in FIG. 1.

In order to carry out the function of spacing/accumulation of the articles, the driving of the individual transfer belts 12 is selective, that is as determined by control circuitry, that will be described more in detail below with respect to FIG. 2a. However, at this point in the description, suffice it to say that the selectivity function is provided by the up and down movement of a pressure roller 30 that is positioned beneath the lower return run 18 of each of the conveyors 12 of modules $C_1$–$C_n$ (see in particular FIGS. 4a, 4b). Specifically, the upper driving run 25 is lifted by upward movement of the pressure roller 13 which is mounted in a cradle 31 by means of one or a plurality of pneumatic motors (3 illustrated in the drawing) and designated by reference numeral 32 (see lifting action arrow in FIG. 4a). It will be understood that each endless transfer belt 12 of a selected module $C_1$–$C_n$ can thus be independently driven depending upon the position of the pressure roller 30 and as determined by the control circuitry. Each actuator assembly 32, made up of the motor (s) 33 is operated by a pneumatic control valve 34, as will be described below.

The control circuitry for the conveyor system 10 of the present invention is illustrated by collectively viewing FIGS. 2, 2a and 3. The preferred embodiment of the circuitry employs a plurality of integrated photocell and controller units $P_1$, $P_2$, $P_3$ and $P_n$ to provide individual control for each of the accumulation zones defined by the transfer belt modules $C_1$–$C_n$, respectively. Since each of the units $P_1$–$P_n$, is identical, the description of one and how it operates in concert with the others will suffice for explaining the operation according to the present invention.

Thus, the photocell/controller unit P of FIG. 2a shows a programmable controller 35 that can be any one of a number of PLC controllers that are available commercially. A photocell 36 is positioned on one side of each modular zone with a reflector 37 being positioned on the opposite side so that an article moving along the conveyor system 10 breaks the light beam and provides a signal that the article is present and ready to fill the next in-line zone, as desired. A timer 37 is operated by the controller 35 at the appropriate time to activate the actuator assembly 32 through the individual pneumatic control valve 34 (see FIGS. 2a and 4a). As illustrated in FIG. 3, a single pneumatic pressure source 38 is operative to provide the pressure to each of the valves 34 that will activate the corresponding actuator assembly 32 associated with each modular zone. As illustrated in FIGS. 3 and 4a, the actuator assembly 32 with the individual pneumatic motor 33, which preferably is in the form of a diaphragm, is positioned directly under the drive belt 20.

Each of the individual, integrated photocell/controller units $P_1$–$P_n$ communicate with each other, to effect proper operation of the upstream conveyor modules and the downstream conveyor modules, as well as the upstream and downstream input/output conveyors, as best represented in FIG. 2 by upstream data lines 40 and downstream data lines 41. In any accumulation operation, each unit $P_1$–$P_n$ thus receives an input and an output signal from the data lines 40, 41 depending on the demands of the system. An output line 42 provides the connection of the controller 35 to the pneumatic control valve 34 through the timer 37. The photocell 36, of course, provides another direct input signal to the controller 35.

In addition, depending on the operation of the upstream input conveyor $C_{in}$ a data line 50 provides an input signal from photocell/controller unit 48 over the same line as data line 40.

Similarly, downstream data line 41 receives an input signal via data line 40 from the downstream photocell/controller unit $P_2$; and likewise signals are transmitted back and forth with respect to the other units. Photocell/controller 49 from the output conveyor $C_{out}$ identifies article demand and generates an upstream signal over data line 51 to provide release of the article $A_n$ from the transfer belt module $C_n$. In addition, a three strand cable 52 (see FIGS. 2 and 3) provides an additional input signal to each of the units $P_1$–$P_n$ from an operation mode override controller 55. As illustrated, the three strand cable is attached to each of the units to not only provide the additional input signal, but also to supply the voltage from voltage source 56 and to interconnect ground 57.

In operation, assuming the zone of module $C_2$ is available to receive an article, individual photocell 36 (one per module zone) has its light beam broken by the presence of an article, such as $A_1$' (see FIG. 1). A signal is transmitted downstream over data line 41 through the programmable controller 36 in order to release the actuator assembly 32 from driving its transfer belt 12. The article $A_1$' has sufficient momentum, (as shown by the dashed line arrow in FIG. 1) to continue forward and take up the position of the next in-line article or the article $A_2$. This action defines the latch accumulation mode. The articles $A_1$–$A_n$ move downstream in sequential series until each module $C_1$–$C_n$ prior to the occupied modular zone is reached, as represented by the above description. The article stops in this zone, such as module $C_2$ in the example, and it is established as occupied. The occupied zone sends a signal through upstream data line 40 to the common downstream data line 41 of the previous module $C_1$ to make it ready to accept and stop the next in-line article; namely article $A_1$, as illustrated in FIG. 1. This sequence of accumulation of articles continues until either the entire line of modular zones is full or a release from the photocell/control circuit 49 of the output conveyor $C_{out}$ calls for the release of articles and thus initiates the next cycle of operation.

In the release operation, the last in-line module $C_n$ activates first to release its article $A_n$ and then sends a signal from its upstream data line 51 to the corresponding data line 41 of the previous module $C_3$ after a short time delay built into the timer 37 associated with the controller 35. This causes this upstream module $C_3$ to release and also send a signal upstream after a similar time delay to send the next article in line to replenish its zone. As each zone is filled, the individual photocell/controller unit $P_1$–$P_n$ operates to complete each cycle.

In a slug release mode, the mode override controller 55 associated with the output conveyor $C_{out}$ provides for simultaneous release of all of the modular zones $C_1$–$C_n$ rather than in sequence. This signal input is provided separately to each of the photocell/controller units $P_1$–$P_n$. over the separate input line of the three strand cable 52 (see FIGS. 2 and 3).

In either latch operation mode or slug operation mode, if the photocell 36 of each individual unit sees no transition of an article for a predetermined length of time, it will deactivate its zone and enter the third mode; that is the sleep mode. The photocell 36 can be brought out of the sleep mode by a transition of the photocell in an upstream zone, based for example in a new article being sent forward by the input conveyor $C_{in}$. In turn, in a domino fashion, each photocell 36 sends a wake-up signal through the upstream/downstream data lines 40, 41 into the sleeping zones downstream causing each to be in turn reactivated. Preferably, each of these signals is subject to a slight delay through the timer 37 associated with the programmable controller 35. The reverse wake-up sequence occurs when a transition occurs from downstream as initiated by the output conveyor $C_{out}$.

While the above description focuses on providing an individual photocell/controller unit $P_1$–$P_n$ for each transfer belt module $C_1$–$C_n$, it will be recognized that a single programmable controller 35 can be used to control the entire conveyor system 10, if desired. The individual integrated units $P_1$–$P_n$ are preferred since the wiring of such a system is reduced to a minimum, and is thus more economical. Furthermore, in the unlikely event that a problem exists, the entire conveyor module of each zone, including the photocell/controller unit for that zone can be replaced, thus reducing the downtime to a minimum.

The input photocell/control circuit 48 and the output photocell/control circuit 49 for the input and output conveyors $C_{in}$ and $C_{out}$, control the operation of the drive motors 63, 64, respectively. As illustrated in FIG. 2, the downstream data line 50 of the circuit 48 and the upstream data line 51 of the circuit 49 provide an effective interconnection for integrating the control of the entire conveyor line.

The outstanding results and advantages of the spacing/ accumulation conveyor system 10 including a plurality of transfer belt modules $C_1$–$C_n$ can now be more fully understood. The articles $A_1$–$A_n$ are handled in a manner by the successive line of transfer belts 12 in a manner that prevents distortion or damage. Deleterious jarring of the contents of the articles is minimized, and the bottom and end faces, such as on drink can carriers, are not subjected to distortion or mutilation. The individual photocell/controller units $P_1$–$P_n$ operating in the manner described, provides for rapid, spaced transfer of articles $A_1$–$A_n$ on the belts 12 through the modules $C_1$–$C_n$, and in a smooth, controlled and efficient manner that is heretofore not been possible.

With regard to additional details of the conveyor system 10 according to the preferred embodiment of the invention, the width of the drive belt 20 can be effective while being limited to between ¼ and ⅓ the width of the transfer belt 12. This feature contributes to the low cost of the entire system, as well as to its overall efficient operation. Also, the upper run 17 of the transfer belt 12 is preferably mounted on a flat plate 70 of stainless steel having a relatively low friction surface to further provide smooth distortion-free transfer and steady of the articles on the transfer run. As best illustrated in FIGS. 4b and 6, a pair of spaced endless guide beads 71 on the underside of the transfer belt adjacent its edges fit in mating grooves to provide for enhanced tracking across each module. Also, the guide rolls, such as guide roll 15 at the end of each modular belt run, includes an annular channel to receive the bead for additional guiding of the belt (see FIG. 4a). Assuming the use of standard industrial belts 12 of approximately 0.80 coefficient of friction supported on the stainless steel plate 70, when any one of the articles $A_1$–$A_n$ is to be stopped, the sliding friction interaction (as the corresponding transfer belt is no longer driven) gradually applies braking drag to stop said articles with controlled deceleration.

In the preferred embodiment, the pressure roller 30 is positioned on the inside of the drive belt, as determined by the end guide rolls 21, 22 (see FIG. 1 and 4a). The cradle 31 supports the pressure roller 30 so that it can be lifted and released selectively by means of the operation of the pneumatic motor(s) 33. Specifically, the motor(s) 33 shifts the section of the upper driving run 20 of the drive belt 12 into engagement with the lower return run 18 of the transfer belt 12 (compare the neutral position of FIG. 4b to the driving position of FIG. 4a).

As another feature of the conveyor system 10 of the present invention, the drive belt 20 is preferably a composite including an outer layer 75 of a compressible mat formed of random textile filaments woven into a solid mat. Preferably, this layer 75 is made up of 100% polyester filaments; although it is to be understood that other mats being formed of other synthetic fibers can be used in accordance with the broader aspects of the present invention. The mat layer 75 serves an important function by providing a gradually increasing coefficient of friction to allow a smooth acceleration/deceleration as the driving interface is engaged/ disengaged. In other words, the driving friction when the moving drive belt 20 first engages the stationary lower return run 18 of the transfer belt 12 is minimized to allow some limited slippage. However, as the mat layer 75 is further compressed, the coefficient of friction increases until the driving interface provides a 1:1 ratio. This essentially prevents grabbing of the belt as the driving interface is engaged and allows for a smooth transition at any time the transfer belt 12 starts to be driven and brought up to speed. The same gradual transfer of driving force occurs as the selected individual module $C_1$–$C_n$ is disengaged in order to bring the corresponding belt 12 to a gentle, rather than an abrupt stop. The body of the drive belt 20 is a standard industrial grade belting material.

If appropriate because of the multi-level layout of a conveyor line, such as in a manufacturing or packaging facility, the conveyor system 10 can be utilized to perform the additional function of changing elevation, either for an incline or decline in level. To do so requires only that the frame $F_2$ be modified to incorporate two angled sections 80, 81 (see FIG. 7). The expanded group of modules $C_{n-1}$, $C_1$–$C_n$ and $C_{n+1}$ are easily adapted to the new configuration without modification by simply fastening them in position. The operation of the system and the resultant advantages are exactly as set forth above. Furthermore, in this arrangement once the sliding friction interaction gently brings the article (s) $A_1$–$A_n$ to a stop, for angles of incline/decline of at least up to approximately 30°, the static friction between the selected plate 70 and the belt 12 prevents retrograde movement.

The operation of the method of the present invention provides special emphasis on the smooth, distortion-free transfer of articles $A_1$–$A_n$ that require special handling, but the method is of course suitable for conveying any articles that require spacing/ accumulation in an efficient manner. A characteristic of the method is in assuring rapid, but controlled spaced transfer to enhance the operational capability of the overall conveyor system 10. The method comprises the steps of providing the endless transfer belt 12, positioning the drive belt 20 so as to be parallel in the longitudinal direction, aligning the upper driving run of the drive belt with the transfer belt, driving the drive belt in a continuous fashion, lifting the driving run into engagement with the transfer belt and finally controlling the spacing between the articles as taught in the description above. By practicing this method, and the extended steps thereof, each transfer belt 12 is driven in a manner to provide the smooth, distortion-free transfer and controlled acceleration/ deceleration under all operating conditions.

When a plurality of transfer belt modules $C_1$–$C_n$ are linked together to form the accumulation conveyor system 10 of the preferred embodiment, substantial additional benefits are attained over the prior art systems. The controlling of the spacing of the articles $A_1$–$A_n$ is performed in a highly efficient manner by employing a simplified control circuitry that features individual photocell/controller units $P_1$–$P_n$. Smooth handling of all of the articles is assured because there is no bumping and jarring over individual rollers, as in the powered roller transfer units of the prior art. By gradually engaging the drive belt 20 through the compressible mat 75, controlled acceleration is assured.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A conveyor system especially adapted for articles having contents, bottom or end faces subject to distortion, but not limited thereto, and requiring rapid, spaced transfer comprising:

at least two modules each having an endless transfer belt aligned in the longitudinal direction and having an upper transfer run and a lower return run to form an accumulation conveyor;

an endless drive belt extending substantially parallel in the longitudinal direction with said transfer belts;

said drive belt having an upper driving run aligned in proximity to, but spaced from the lower return run of said transfer belts to establish a neutral position;

a driving mechanism for said drive belt;

an actuator assembly for each module for selectively lifting at least said upper driving run from said neutral position into individual frictional driving engagement with the lower return run of one of said transfer belts; and a controller for said actuator assemblies for controlling the spacing of said articles, whereby each said transfer belt is driven by frictional engagement between the belts to provide the accumulation of articles with smooth, distortion-free article transfer and controlled acceleration/deceleration with respect to the transfer speed.

2. The conveyor system of claim 1, wherein is provided an article sensor and an individual controller associated with each transfer belt module; each controller being operative in response to the corresponding sensor sensing each article in series to position only one article for each module to control the article transfer and assure zero pressure between the articles.

3. The conveyor system of claim 1, wherein said drive belt is aligned approximately with the longitudinal axis of said transfer belts and having a width of between one-fourth and one-third of said transfer belt.

4. The conveyor system of claim 1, wherein said drive belt is a composite including an outer layer of a compressible mat providing a gradually increasing coefficient of friction and an inner layer forming a flexible but substantially non-elastic base.

5. The conveyor system of claim 1, wherein the upper run of each said transfer belt is supported on a flat plate having a low friction surface to provide smooth distortion-free transfer and to steady said articles, and to gradually apply sliding friction brake drag to stop the articles with controlled deceleration.

6. The conveyor system of claim 5, wherein is provided lateral guide channels along the edges of said plate and corresponding endless guide beads on the underside of each said transfer belt.

7. The conveyor system of claim 6, wherein are provided guide rolls for each said transfer belt, and an annular channel at each end to receive said bead for additional guiding of said belt.

8. The conveyor system of claim 1, wherein each said actuator assembly includes at least one pressure roller on the inside of said drive belt, a cradle to support said pressure roller and an actuator for lifting said cradle and said roller to shift the upper driving run into engagement with the lower return run of said transfer belt for driving.

9. The conveyor system of claim 8, wherein said actuator includes at least one pneumatic motor to lift said cradle in response to operation of a valve by said controller and a pneumatic pressure source to power said motor.

10. The conveyor system of claim 9, wherein said pneumatic motor comprises a diaphragm.

11. The method of driving a conveyor assembly, especially adapted for articles having contents, bottom or end faces subject to distortion, but not limited thereto, and requiring rapid, spaced transfer comprising the steps of:

providing at least two modules each having an endless transfer belt aligned in the longitudinal direction and having an upper transfer run and a lower return run to form an accumulation conveyor;

positioning an endless drive belt extending substantially parallel in the longitudinal direction with said transfer belts;

aligning the upper driving run of said drive belt in proximity to, but spaced from the lower return run of said transfer belts to establish a neutral position;

driving said drive belt;

selectively lifting at least said upper driving run from said neutral position into engagement with the lower return run of one of said transfer belts; and controlling the selective lifting for spacing of said articles, whereby driving said transfer belt is by frictional engagement between the belts to provide the accumulation of articles with smooth, distortion free article transfer and controlled acceleration/deceleration with respect to transfer speed.

12. The conveyor driving method of claim 11, wherein is provided the additional step of sensing each article in series to assist in the step of controlling the spacing of said articles and to position only one article for each module, and thereby control the article transfer and assure zero pressure between the articles.

13. The conveyor driving method of claim 1, wherein is provided the additional step of supporting the upper run of each said transfer belt on a flat plate having a relatively low friction surface to provide smooth distortion-free transfer and steady said articles.

14. The conveyor driving method of claim 11, continuously driving said drive belt and gradually engaging said drive belt with said transfer belt to provide controlled acceleration.

15. A conveyor system especially adapted for articles having contents, bottom or end faces subject to distortion, but not limited thereto, and requiring rapid, spaced transfer comprising:

at least two modules each having an endless transfer belt aligned in the longitudinal direction and having an upper transfer run and a lower return run to form an accumulation conveyor;

an endless drive belt extending substantially parallel in the longitudinal direction with said transfer belts;

said drive belt having a driving run aligned in proximity to, but spaced from one of the runs of said transfer belts to establish a neutral position;

a driving mechanism for said drive belt;

an actuator assembly for each module for selectively shifting said driving run into frictional driving engagement with said one run of said transfer belt; and a controller for said actuator assemblies for controlling the spacing of said articles, whereby each said transfer belt is driven by frictional engagement between the belts to provide the accumulation of articles with smooth, distortion-free article transfer and controlled acceleration/deceleration with respect to the transfer speed.

16. The conveyor driving system of claim 15, wherein is provided an article sensor and individual controller associated with each transfer belt module; each controller being operative in response to the corresponding sensor sensing each article in series to position only one article for each module to control the article transfer and assure zero pressure between the articles.

17. The conveyor driving system of claim 16, wherein said drive belt is positioned below said one run forming the return run of said transfer belt, said driving run being the upper run of said drive belt and said actuator assembly being operative to lift said upper driving run into engagement with the lower return run of said transfer belt.

18. The conveyor driving system of claim 15, wherein is provided a pair of angled sections associated with said transfer belt modules to implement a change in elevation for conveying said articles.

* * * * *

UNITED STATES PATENT AND TRADEMARK OFFICE
CERTIFICATE OF CORRECTION

PATENT NO.    : 6,193,054 B1
DATED         : February 27, 2001
INVENTOR(S)   : Mark W. Henson, Floyd Robertson, Jr.

It is certified that error appears in the above-identified patent and that said Letters Patent is hereby corrected as shown below:

Column 12,
Line 1, after "wherein", insert -- each --.
Line 1, after "actuator", insert -- assembly --.
Line 36, replace "claim 1" with -- claim 11 --.

Signed and Sealed this

Sixth Day of November, 2001

Attest:

NICHOLAS P. GODICI
Attesting Officer
Acting Director of the United States Patent and Trademark Office